US010218971B2

(12) United States Patent
Dong et al.

(10) Patent No.: US 10,218,971 B2
(45) Date of Patent: Feb. 26, 2019

(54) ADAPTIVE UPSAMPLING FOR MULTI-LAYER VIDEO CODING

(71) Applicant: Vid Scale, Inc., Wilmington, DE (US)

(72) Inventors: Jie Dong, San Diego, CA (US); Enming Luo, San Diego, CA (US); Yuwen He, San Diego, CA (US); Yan Ye, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 298 days.

(21) Appl. No.: 14/431,978

(22) PCT Filed: Sep. 27, 2013

(86) PCT No.: PCT/US2013/062149
§ 371 (c)(1),
(2) Date: Mar. 27, 2015

(87) PCT Pub. No.: WO2014/052740
PCT Pub. Date: Apr. 3, 2014

(65) Prior Publication Data
US 2015/0256828 A1    Sep. 10, 2015

Related U.S. Application Data

(60) Provisional application No. 61/750,883, filed on Jan. 10, 2013, provisional application No. 61/706,941, filed on Sep. 28, 2012.

(51) Int. Cl.
*H04N 19/117* (2014.01)
*H04N 19/176* (2014.01)
(Continued)

(52) U.S. Cl.
CPC ......... *H04N 19/117* (2014.11); *H04N 19/136* (2014.11); *H04N 19/147* (2014.11);
(Continued)

(58) Field of Classification Search
CPC .... H04N 19/117; H04N 19/136; H04N 19/80; H04N 19/147; H04N 19/187
See application file for complete search history.

(56) References Cited

U.S. PATENT DOCUMENTS 8,107,571 B2 * 1/2012 Sullivan ............. H03H 17/0294
375/350
8,483,271 B2 * 7/2013 Chen .................... H04N 19/597
348/42

(Continued)

FOREIGN PATENT DOCUMENTS

CN    101077013 A    11/2007
EP     1720358 A2    11/2006
(Continued)

OTHER PUBLICATIONS

Tsai et al."Classified Multifilter Up-Sampling Algorithm in Spatial Scalability for H.264/SVC Encoder",IEEE Transactions on Circuits and Systems for Video Technology, vol. 20, No. 6, Jun. 2010, pp. 861-869.

(Continued)

*Primary Examiner* — Tsion B Owens
(74) *Attorney, Agent, or Firm* — Condo Roccia Koptiw LLP

(57) ABSTRACT

Systems, methods, and instrumentalities are disclosed for adaptive upsampling for multi-layer video coding. A method of communicating video data may involve applying an upsampling filter to a video sequence to create encoded enhancement layer pictures. The upsampling filter may be applied at a sequence level of the video sequence to create the enhancement layer bitstream. The upsampling filter may be selected from a plurality of candidate upsampling filters, for example, by determining whether knowledge of a category related to the video sequence exists and selecting a candidate upsampling filter that is designed for the category (Continued)

related to the video sequence. Upsampling filter information may be encoded. The encoded upsampling information may comprise a plurality of coefficients of the upsampling filter. The encoded upsampling filter information and the encoded enhancement layer pictures may be sent in an output video bitstream. The method may be performed, for example, by an encoder.

20 Claims, 11 Drawing Sheets

(51) Int. Cl.
H04N 19/70 (2014.01)
H04N 19/147 (2014.01)
H04N 19/172 (2014.01)
H04N 19/61 (2014.01)
H04N 19/136 (2014.01)
H04N 19/174 (2014.01)
H04N 19/179 (2014.01)
H04N 19/192 (2014.01)
H04N 19/80 (2014.01)
H04N 19/33 (2014.01)
H04N 19/59 (2014.01)
H04N 19/187 (2014.01)
H04N 19/159 (2014.01)

(52) U.S. Cl.
CPC ......... *H04N 19/172* (2014.11); *H04N 19/174* (2014.11); *H04N 19/176* (2014.11); *H04N 19/179* (2014.11); *H04N 19/187* (2014.11); *H04N 19/192* (2014.11); *H04N 19/33* (2014.11); *H04N 19/59* (2014.11); *H04N 19/61* (2014.11); *H04N 19/70* (2014.11); *H04N 19/80* (2014.11); *H04N 19/159* (2014.11)

(56) References Cited

U.S. PATENT DOCUMENTS

| 9,014,263 | B2* | 4/2015 | Leontaris | H04N 19/597 |
| | | | | 375/240.03 |
| 9,270,871 | B2* | 2/2016 | Pahalawatta | H04N 5/21 |
| 9,369,691 | B2* | 6/2016 | Eymard | H04N 7/24 |
| 9,438,920 | B2* | 9/2016 | Shimada | H04N 19/186 |
| 9,660,913 | B2* | 5/2017 | Newton | H04L 41/0893 |
| 9,973,779 | B2* | 5/2018 | Konstantinides | H04N 19/597 |
| 2006/0268991 | A1* | 11/2006 | Segall | H04B 1/66 |
| | | | | 375/240.24 |
| 2006/0294171 | A1 | 12/2006 | Bossen et al. | |
| 2007/0096964 | A1* | 5/2007 | Veselinovic | H03H 17/0294 |
| | | | | 341/144 |
| 2007/0217502 | A1 | 9/2007 | Ammar et al. | |
| 2010/0150229 | A1 | 6/2010 | Francois et al. | |
| 2012/0026288 | A1 | 2/2012 | Tourapis et al. | |

FOREIGN PATENT DOCUMENTS

| EP | 1746839 A1 * | 1/2007 | ........... H04N 19/172 |
| EP | 1746839 A1 * | 1/2007 | ........... H04N 19/172 |
| JP | 2006-279383 A | 10/2006 | |
| JP | 2006-295913 A | 10/2006 | |
| JP | 2008-544708 A | 12/2008 | |
| JP | 2010-081368 A | 4/2010 | |
| WO | WO 2007/020230 A2 | 2/2007 | |
| WO | WO 2007/080477 A2 | 7/2007 | |

OTHER PUBLICATIONS

Bross et al., "High Efficiency Video Coding (HEVC) Text Specification Draft 8", JCTVC-J1003, Joint Collaborative Team on Video Coding (JCT-VC) of ITU-T SG16 WP3 and ISO/IEC JTC1/SC29/WG11, 10th Meeting: Stockholm, SE, Jul. 11-20, 2012, 294 pages.
ISO/IEC, "Joint Call for Proposals on Scalable Video Coding Extensions of High Efficiency Video Coding (HEVC)", ISO/IEC JTC 1/SC 29/WG 11 and ITU-T SG 16 WP 3, ISO/IEC JTC1/SC29/WG11 N12957, Stockholm, Sweden, Jul. 2012, pp. 1-11.
ITU-T, "Advanced Video Coding for Generic Audiovisual Services" , Series H: Audiovisual and Multimedia Systems, Infrastructure of Audiovisual Services-Coding of Moving Video, ITU-T Recommendation H.264, Nov. 2007, 564 pages.
Dong et al, "Downsampling Filters for Anchor Generation for Scalable Extensions of HEVC," InterDigital Communications,LLC, ISO/IEC JTC1/SC29/WG11 MPEG2012/M24499, Geneva, Switzerland, May 2012, 4 pages.
JM reference software JM16.1, Document Available at: http://iphome.hhi.de/suehring/tml/download/jm16.1.zip , Sep. 2009.
Luthra et al., "Requirements of the Scalable Enhancement of HEVC", WG11 Requirements and Video, ISO/IEC JTC1/SC29/WG11 N12956, Stockholm, Sweden, Jul. 2012, 12 pages.
Luthra, Ajay, "Use Cases for the Scalable Enhancement of HEVC", WG11 AHG on Study of HEVC Extensions, ISO/IEC JTC-1/SC29/WG11 M24483, Geneva, Switzerland, Apr. 2012, 8 pages.
SMPTE, "VC-1 Compressed Video Bitstream Format and Decoding Process-Amendment 1", Amendment 1-2007 to SMPTE 421M-2006, Nov. 29, 2007, pp. 1-5.
Sullivan et al., "Rate-Distortion Optimization for Video Compression", Signal Processing Magazine, IEEE, vol. 15, No. 6, Nov. 1998, pp. 74-90.

* cited by examiner

ADAPTIVE UPSAMPLING FOR MULTI-LAYER VIDEO CODING

CROSS-REFERENCE TO RELATED APPLICATIONS

This application is the National Stage Entry under 35 U.S.C. § 371 of Patent Cooperation Treaty Application No. PCT/US2013/062149, filed Sep. 27, 2013, which claims the benefit of U.S. Provisional Patent Application No. 61/706,941, filed Sep. 28, 2012 and U.S. Provisional Patent Application No. 61/750,883, filed Jan. 10, 2013, the contents of which are hereby incorporated by reference herein.

BACKGROUND

Video coding systems may be used to compress digital video signals to reduce the storage need and/or transmission bandwidth of such signals. Video coding systems may include block-based systems, wavelet-based systems, object-based systems, etc. Block-based hybrid video coding systems may be used and deployed. Examples of block-based video coding systems include, but are not limited to, international video coding standards such as the MPEG1/2/4 part 2, H.264/MPEG-4 part 10 AVC and VC-1 standards.

With the growth of smartphones and tablets both in resolution and computation capability, additional video applications, such as video chat, mobile video recording and sharing, and video streaming, may transmit video data in heterogeneous environments. Scenarios such as 3-screen and N-screen that consider various consumer devices (e.g., PCs, smartphones, tablets, TVs, etc.) may accommodate video consumption on devices with widely varying capabilities in terms of computing power, memory/storage size, display resolution, display frame rate, etc. The network and transmission channels may have widely varying characteristics in terms of packet loss rate, available channel bandwidth, burst error rate, etc. Video data may be transmitted over a combination of wired networks and wireless networks, which may further complicate the underlying transmission channel characteristics.

Scalable video coding may provide a solution to improve the quality of experience for video applications running on devices with different capabilities over heterogeneous networks.

Scalable video coding may encode a signal once at a highest representation (e.g., temporal resolution, spatial resolution, quality, etc.) and may enable decoding from subsets of the video streams depending on the specific rate and representation used by the applications running on client devices. Scalable video coding may save bandwidth and storage compared to non-scalable solutions. Video standards, such as but not limited to, MPEG-2 Video, H.263, MPEG4 Visual and H.264 may have tools and/or profiles that support some modes of scalability.

SUMMARY

Systems, methods, and instrumentalities are disclosed for adaptive upsampling for multi-layer video coding. A method of communicating video data may involve applying an upsampling filter to a video sequence to create encoded enhancement layer pictures. Upsampling filter information may be encoded. The encoded upsampling information may comprise a plurality of coefficients of the upsampling filter. The encoded upsampling filter information and the encoded enhancement layer pictures may be sent in an output video bitstream. The method may be performed, for example, by an encoder.

A method of communicating video data may involve receiving an input bitstream comprising an encoded enhancement layer picture and/or upsampling filter information pertaining to an upsampling filter that was used to create the encoded enhancement layer picture. The upsampling filter information may be decoded to construct the upsampling filter. The upsampling filter may be applied at least in part to upsample a base layer picture. For example, the upsampling filter may be applied at a sequence level to decode the enhancement layer picture of a video sequence. The upsampling filter may be applied at a picture level of a video sequence, at a slice level of a video sequence, and/or at a block level of a video sequence. The upsampled base layer picture may be used to decode the encoded enhancement layer picture. A first upsampling filter may be constructed from first upsampling filter information in the input bitstream. A second upsampling filter may be constructed from second upsampling filter information in the input bitstream. The first upsampling filter may be applied to upsample a first set of pixels in the base layer picture. The second upsampling filter may be applied to upsample a second set of pixels in the base layer picture. The first and second sets of pixels represent different pixels in the base layer picture. The method may be performed, for example, by a decoder.

A method of signaling upsampling filter information may involve categorizing each filter of a plurality of upsampling filters as either a fixed filter or a custom filter and determining which filters of the plurality of upsampling filters are relevant for encoding a part of a video sequence. The determination of relevant filters may be based on an amount of motion in the video sequence, on an amount of edge information in the video sequence, and/or on a directionality of edges in the video sequence. Indices corresponding to the relevant fixed filters may be encoded. Filter coefficients corresponding to the relevant custom filters may be encoded. The encoded indices and the encoded filter coefficients may be transmitted together in a video bitstream. The method may be performed, for example, by an encoder.

DETAILED DESCRIPTION

Figure 1:
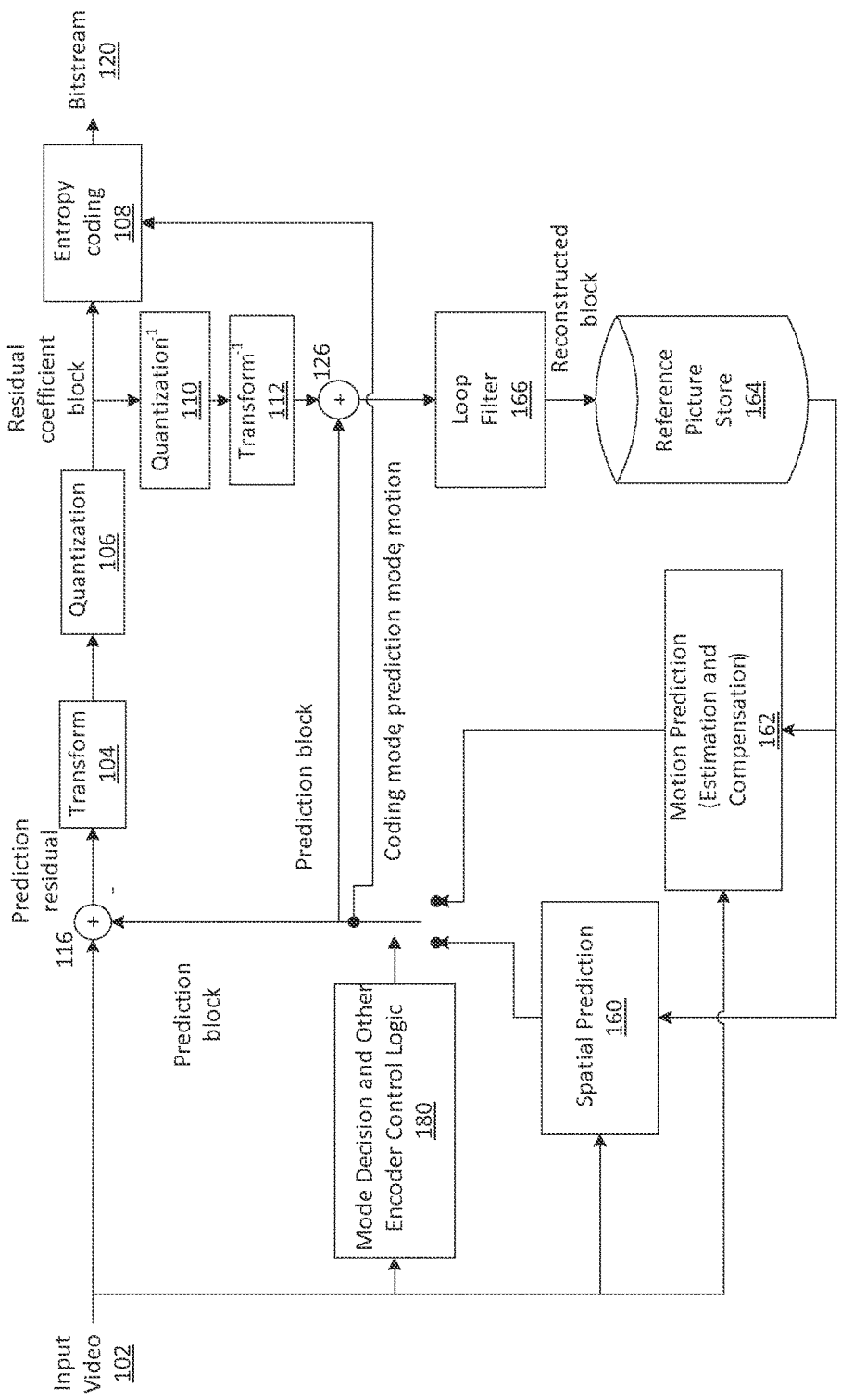
FIG. 1 is a diagram illustrating an example of a block-based hybrid video encoding system.

FIG. 1 is a diagram illustrating an example of a block-based hybrid video encoding system. An input video signal 102 may be processed block by block. The video block unit may comprise 16×16 pixels. A block unit may be referred to as a macroblock or MB. In High Efficiency Video Coding (HEVC), extended block sizes (e.g., which may be referred to as a coding unit or CU) may be used to compress high resolution (e.g., 1080p and beyond) video signals. In HEVC, a CU may be up to 64×64 pixels. A CU may be further partitioned into prediction units (PU), for which separate prediction implementations may be applied. For an input video block (e.g., MB or CU), spatial prediction 160 and/or temporal prediction 162 may be performed. Spatial prediction (e.g., intra prediction) may use pixels from the already coded neighboring blocks in the same video picture/slice to predict the current video block. Spatial prediction may reduce spatial redundancy inherent in the video signal. Temporal prediction (which may be referred to, e.g., as inter prediction or motion compensated prediction) may use pixels from already coded video pictures to predict the current video block. Temporal prediction may reduce temporal redundancy inherent in the video signal. A temporal prediction signal for a given video block may include one or more motion vectors and one or more reference picture indexes if multiple reference pictures are used (e.g., which may be used to identify from which reference pictures in a reference picture store 164 the temporal prediction signal comes).

After spatial and/or temporal prediction, a mode decision block 180 in the encoder may choose a prediction mode, e.g., the best prediction mode, for example, based on a rate-distortion optimization example. The prediction block may be subtracted from a current video block at 116. The prediction residual may be transformed at 104 and quantized at 106. The quantized residual coefficients may be inverse quantized at 110 and inverse transformed at 112 to form a reconstructed residual, which may be added to the prediction block at 126 to form the reconstructed video block. Further in-loop filtering 166, such as, but not limited to, a deblocking filter and Adaptive Loop Filters may be applied on the reconstructed video block before it is put in the reference picture store 164 and/or used to code future video blocks. To form an output video bitstream 120, coding mode (e.g., inter or intra), prediction mode information, motion information, and/or quantized residual coefficients may be sent to an entropy coding unit 108 to be compressed and packed to form the bitstream 120.

Figure 2:
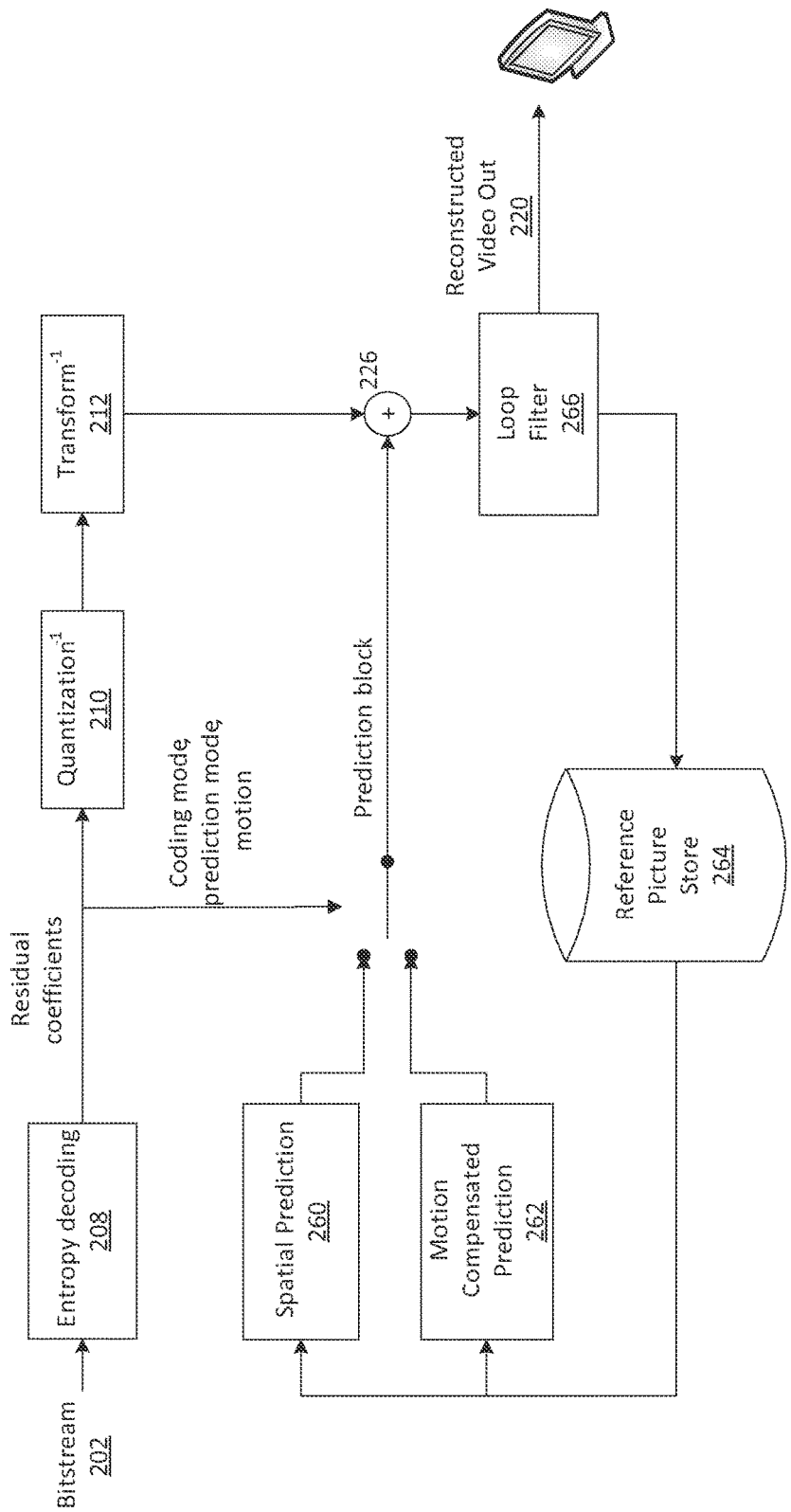
FIG. 2 is a diagram illustrating an example of a block-based video decoder.

FIG. 2 is a diagram illustrating an example of a block-based video decoder. The block-based video decoder of FIG. 2 may correspond to the block-based video encoder of FIG. 1. A video bitstream 202 may be unpacked and entropy decoded at an entropy decoding unit 208. The coding mode and prediction information may be sent to a spatial prediction unit 260 (e.g., if intra coded) and/or a temporal prediction unit 262 (e.g., if inter coded) to form the prediction block. The residual transform coefficients may be sent to an inverse quantization unit 210 and/or an inverse transform unit 212 to reconstruct the residual block. The prediction block and the residual block may be added together at 226. The reconstructed block may go through in-loop filtering before it is stored in a reference picture store 264. The reconstructed video in the reference picture store may be sent to drive a display device and/or used to predict future video blocks.

Figure 3:
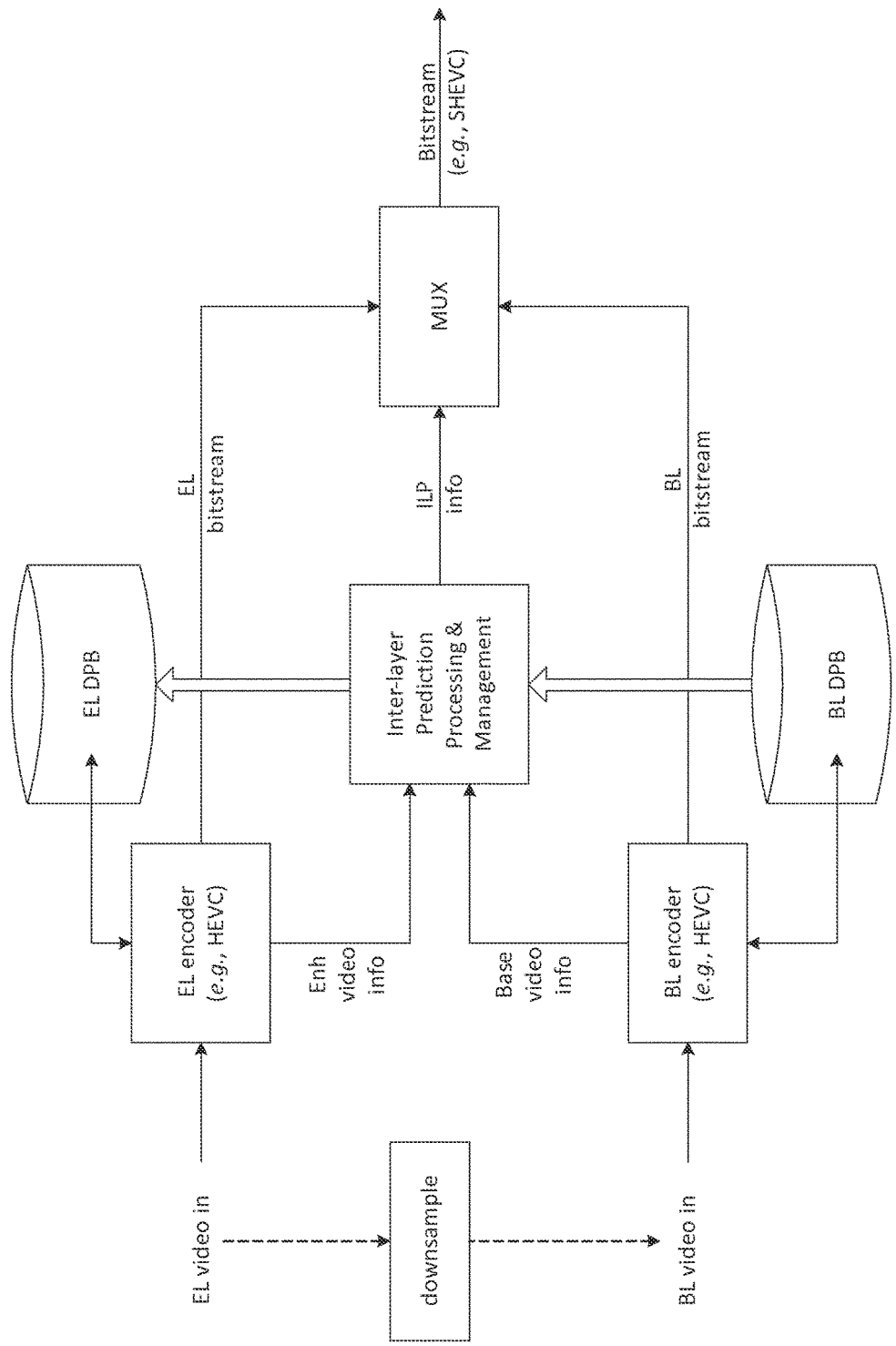
FIG. 3 is a diagram illustrating an example of a two-layer scalable video encoding system.

FIG. 3 is a diagram illustrating an example of a scalable video encoding system. In FIG. 3, a two-layer scalable coding system with one base layer and one enhancement layer may be illustrated. The spatial resolutions between the two layers may be different (e.g., spatial scalability may be applied). The base layer encoder (e.g., which may be illustrated an HEVC encoder in FIG. 3) may encode a base layer video input stream block by block and generate a base layer bitstream, for example, as illustrated in FIG. 1. An enhancement layer encoder may encode an enhancement layer video input stream block by block and generate an enhancement layer bitstream, for example, as illustrated in FIG. 1.

To improve the coding efficiency of the scalable system, when the enhancement layer video is encoded, signal correlation from the base layer reconstructed video may be used to improve its prediction accuracy. For example, as shown in FIG. 3, the base layer reconstructed video may be processed and one or more of the processed base layer pictures may be inserted into an enhancement layer decoded picture buffer (DPB) and used to predict the enhancement layer video input. The base layer and the enhancement layer videos may be essentially the same video source represented in different spatial resolutions. As shown in FIG. 3, they may correspond to each other via the downsampling process. For example, an ILP processing step carried out by an inter-layer processing and management unit (e.g., as shown in FIG. 3) may be an upsampling operation used to align the spatial resolution of the base layer reconstruction with that of the enhancement layer video. In addition to the base layer bitstream and the enhancement layer bitstream produced by the base and enhancement layer encoders, inter-layer prediction (ILP) information may be produced by the ILP processing and management unit. For example, the ILP information may include, but is not limited to the type of inter-layer processing that may be applied, the parameters that may be used in the processing (e.g., any upsampling filters that may be used), which of the one or more processed base layer pictures may be inserted into the enhancement layer DPB, etc. The base and enhancement layer bitstreams and the ILP information may be multiplexed together, e.g., by a multiplexer to form a scalable bitstream.

Figure 4:
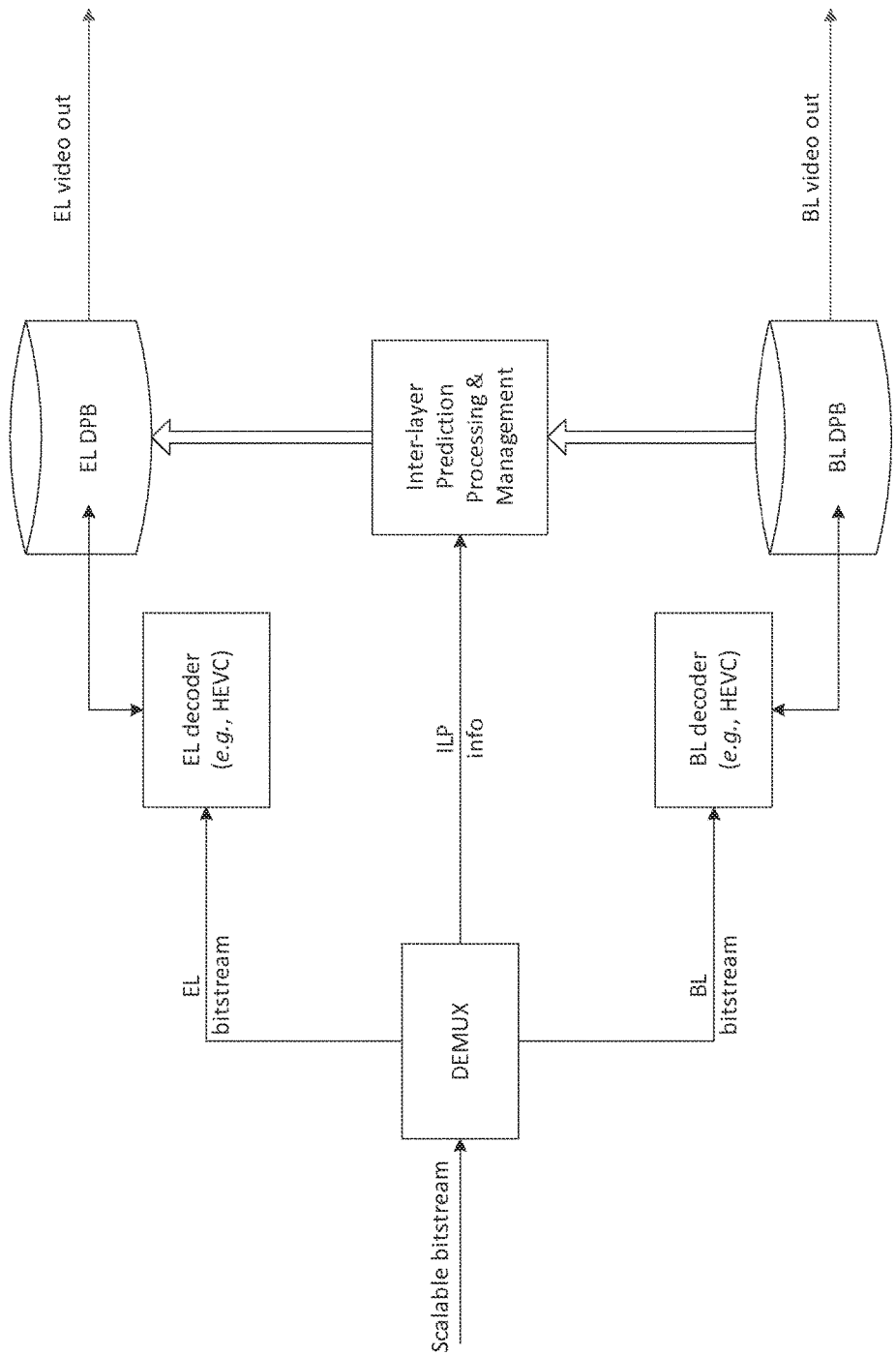
FIG. 4 is a diagram illustrating an example of a two-layer scalable video decoder.

FIG. 4 is a diagram illustrating an example of a two-layer scalable video decoder. The two-layer scalable video decoder of FIG. 4 may correspond to the scalable encoder in FIG. 3. The decoder may perform the operations in reverse of the encoder. For example, a scalable bitstream may be de-multiplexed at a demultiplexer into a base layer bitstream, an enhancement layer bitstream, and ILP information. A base layer decoder may decode the base layer bitstream. The base layer decoder may produce the base layer reconstruction. An ILP processing and management unit may receive the ILP information. The ILP processing and management unit may process the base layer reconstruction. This may be done in accordance with the received ILP information. The ILP processing and management unit may selectively insert one or more of the processed base layer pictures into an enhancement layer DPB. This may be done in accordance with the received ILP information. An enhancement layer decoder may decode the enhancement layer bitstream, for example, with a combination of temporal reference pictures and inter-layer reference pictures (e.g., the processed base layer pictures) to reconstruct the enhancement layer video.

The terms "inter layer reference picture" and "processed base layer pictures" may be used interchangeably.

Performing picture level ILP in the scalable system, for example as shown in FIG. 3 and FIG. 4, may provide reduced implementation complexity. This may be because the base layer and enhancement layer encoder and decoder logics at the block level may be reused without changes. High level (e.g., picture/slice level) configurations involving the insertion of one or more of the processed base layer pictures into the enhancement layer DPB may be used. Block level changes may be allowed in the scalable system to facilitate block-level inter-layer prediction in addition to picture level inter-layer prediction.

The design and/or application of one or more upsampling filters to the base layer pictures may have an impact on the quality of inter layer reference picture and the coding efficiency of the enhancement layer. One upsampling filter may be used for different kinds of video content and bit-rates. Using one upsampling filter may not be enough to efficiently exploit various spatial characteristics. Upsampling filter(s) may be 2-D separable, which may indicate that upsampling a picture may be accomplished by upsampling the rows and columns sequentially. This type of filter may not preserve the edge details along non-horizontal or non-vertical directions but may have lower complexity compared with 2-D non-separable filters. Mode dependent directional upsampling (e.g., which may be a type of adaptive upsampling) may be used to upsample intra blocks in the base layer picture. Mode dependent directional upsampling may employ one or more upsampling filters, which may be applied depending on the one or more intra prediction modes in the base layer video blocks. Such upsampling examples may adapt the upsampling filter to block-level without using additional bits to indicate which filter is selected and/or may improve the quality of the upsampled base layer blocks coded using intra prediction modes.

Examples relating to the quality of inter layer reference pictures and inter layer prediction when coding the enhancement layer pictures are described herein. A plurality of upsampling filters may be designed and adaptively use at a sequence level, at a picture/slice level, and/or at a block level. The level of adaptation may be determined at least in part by the prior knowledge and/or the balance of computational complexity, size of overhead bits, and/or coding efficiency. Examples described herein may include a plurality of upsampling filters that may be designed to deal with arbitrary edge directions and other spatial characteristics, a plurality of upsampling filters that may be selectively used in sequence-level, picture/slice-level, and/or block-level, and/or a plurality of upsampling filters that may be pre-defined or customized by the encoder.

The disclosed subject matter may be exemplified utilizing a two-layer, spatial scalable, video coding system. An underlying single layer encoder/decoder may be described using a HEVC encoder/decoder as an example. The disclosed subject matter may be applicable to other scalable systems (e.g., more than two layers, other types of scalability, and/or other underlying single layer encoder/decoder).

Adaptive upsampling examples may be described herein. An upsampling filter may be designed, trained, for example, using a Least Squared (LS) method using a set of training data that may comprise one or more base layer reconstruction pictures and/or one or more enhancement layer original input pictures to be coded. An upsampling filter may reduce or minimize the mean squared error (MSE) between one or more upsampled base layer reconstruction pictures and one or more enhancement layer original input pictures. To train one or more upsampling filters, one or more sets of training data may be constructed. A set of training data may comprise one or more base layer reconstruction pictures and/or one or more enhancement layer original input pictures in a given video sequence. The trained upsampling filter may be efficient for that training video sequence. A video sequence may be classified into one or more categories (e.g., stationary, high motion, edge-rich, homogeneous, etc.). One or more base layer reconstruction pictures and/or one or more enhancement layer original input pictures may be classified into a video sequence category from the training data set for the corresponding upsampling filter. A trained upsampling filter may be efficient for a certain category of video sequences.

An upsampling filter may be created by ensuring that a frequency response of the filter possesses a desired directionality. For example, a 2-D upsampling filter without directionality may be represented by a 2-D Sin c function clipped by a window function, for example as shown in Equation (1):

$$f(x,y) = \text{Sin } c(ax)\text{Sin } c(by)w(x,y) \quad \text{Equation (1)}$$

where a and b may be two parameters controlling the cut-off frequencies in horizontal and vertical directions in the frequency domain. In order to preserve the edge details along a certain direction (e.g., which may assume the direction has an angle θ from the horizontal direction), the desired directional upsampling filter may be obtained by rotating the original coordinate counterclockwise by an angle θ, for example, as shown in Equation (2):

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix} \quad \text{Equation (2)}$$

Based on Equation (1) and Equation (2), an upsampling filter with the desired directionality may be derived, for example, as shown in Equation (3):

$$f(x,y,\theta) = \text{Sin } c(a(\cos\theta x + \sin\theta y))\text{Sin } c(b(-\sin\theta x + \cos\theta y))w(\cos\theta x + \sin\theta y, -\sin\theta x + \cos\theta y) \quad \text{Equation (3)}$$

Upsampling filters obtained by training implementations and/or by theoretical derivation implementations may have real-valued numbers. When realized in software and/or hardware, they may be approximated by values, e.g., integers with certain precision. A lower precision may result in lower implementation complexity, but the performance of the upsampling filter may be degraded. A higher precision may result in improved performance of the upsampling filter, but may also result in higher implementation complexity. For example, the precision may be 8-bits, which may indicate that the values of the filter coefficients may be quantized within 256 steps. When the upsampling filter is applied to pixels, which may have 8-bit precision (e.g., from 0 to 255), two multipliers, the pixel value and the filter coefficient, may have 8-bit precision and the product may not exceed a 16-bit dynamic range.

After one or more (e.g., a set) of upsampling filters is in place, an encoder may adaptively apply one or more (e.g., any) of the upsampling filters during the encoding process. An upsampling filter may be selected by different means and/or at different coding levels (e.g., sequence-level, picture/slice-level, and/or block-level).

If the encoder has prior knowledge of the content of the video sequence and there is an upsampling filter designed for the video sequence or for a category to which the video sequence belongs, the encoder may select the upsampling filter at the beginning of the encoding process. The encoder may maintain, e.g., may not change the upsampling filter throughout the encoding process. This may be referred to as sequence-level adaptation. The encoder may use a trained upsampling filter throughout the encoding process of the video sequence. Determining prior knowledge of the content and/or category of a video sequence may refer to determining a content and/or category associated with the video sequence (e.g., associated with one or more properties of the video sequence). Upon determining a content and/or category associated with the video sequence, the encoder may select an upsampling filter (e.g., from a plurality of candidate upsampling filters) based on the content and/or category.

If the encoder does not have prior knowledge about the video sequence or has unreliable knowledge, the encoder may use one or more (e.g., all or a subset) of the trained upsampling filters as candidate upsampling filters for the encoding process. The encoder may select one of the candidate upsampling filters on a picture basis. This may be referred to as picture/slice-level adaptation. The encoder may select one of the candidate upsampling filters on a block basis. This may be referred to as block-level adaptation.

Examples relating to selecting an upsampling filter(s) and a level of adaptation of the selected upsampling filter(s) may be described herein. For example, video sequence-level adaptation, picture/slice-level adaptation, and block-level adaptation may be described herein.

From a set of upsampling filters (e.g., candidate upsampling filters), one or more (e.g., a subset) of the upsampling filters may be used by the encoder to code the current video sequence. The one or more upsampling filters may be indicated in a sequence header, e.g., a sequence parameter set (SPS). If one upsampling filter is indicated in SPS, then picture/slice-level or block-level adaptation may be disabled, e.g., may not be enabled. This may be because video sequence-level adaptation is enabled. If more than one upsampling filter is indicated in SPS, then picture/slice-level and/or block-level adaptation may be enabled.

Figure 5:
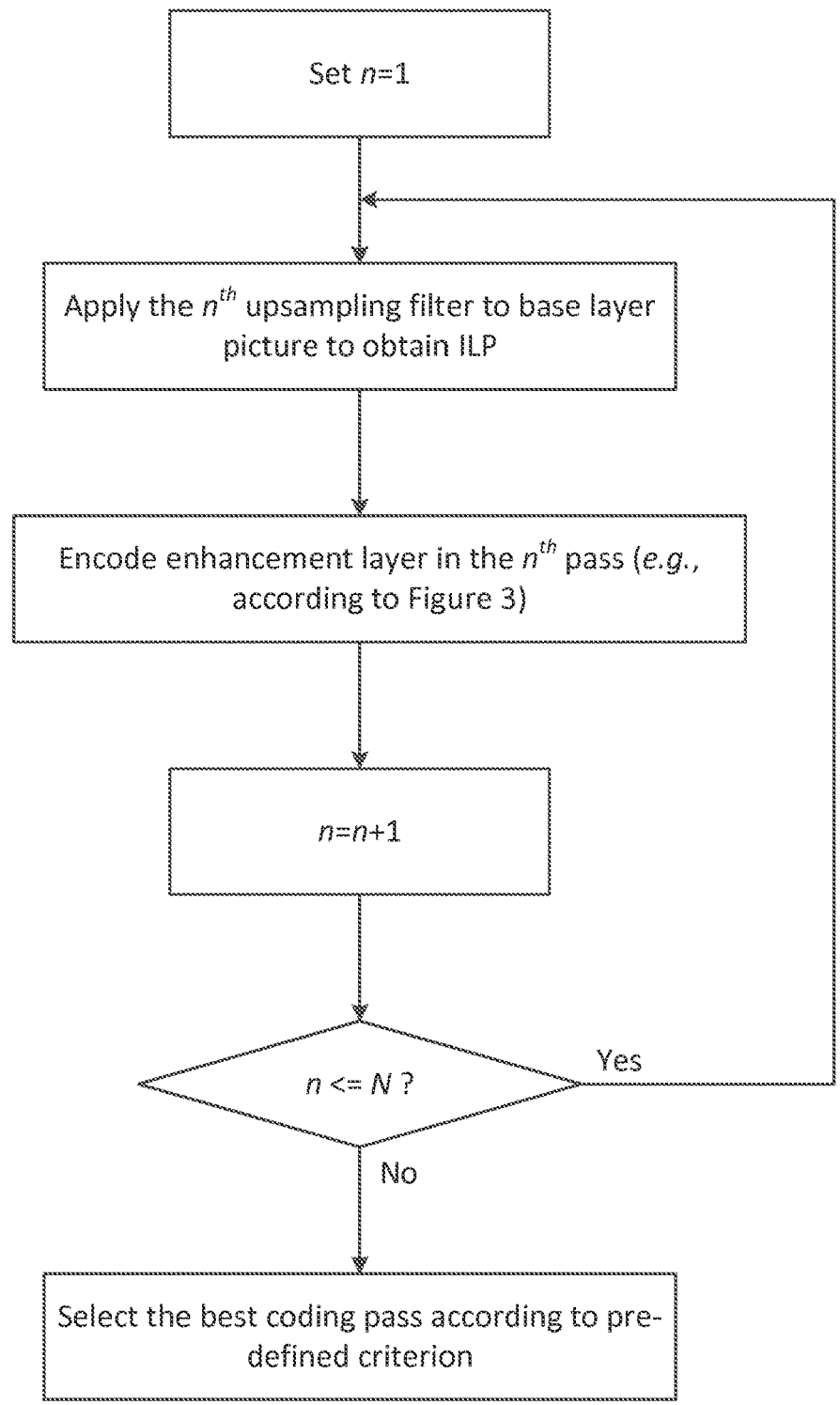
FIG. 5 is a flow chart illustrating an example of picture/slice-level filter selection based on multi-pass encoding.

Picture/slice-level adaptation may be described. The number of candidate upsampling filters used for coding a video sequence may be denoted as N. FIG. 5 is a flow chart illustrating an example of picture/slice-level filter selection based on multi-pass encoding. In the $n^{th}$ ($1 \leq n \leq N$) coding pass, the encoder may encode the current enhancement layer picture using processed base layer pictures processed by the $n^{th}$ upsampling filter. After N-pass encoding, the encoder may select a candidate upsampling filter of the N coding passes using a predefined criterion. For example, the encoder may select the upsampling filter whose coding pass has the smallest rate distortion cost. The encoder may use the selected upsampling filter to encode the current enhancement layer picture.

Figure 6:
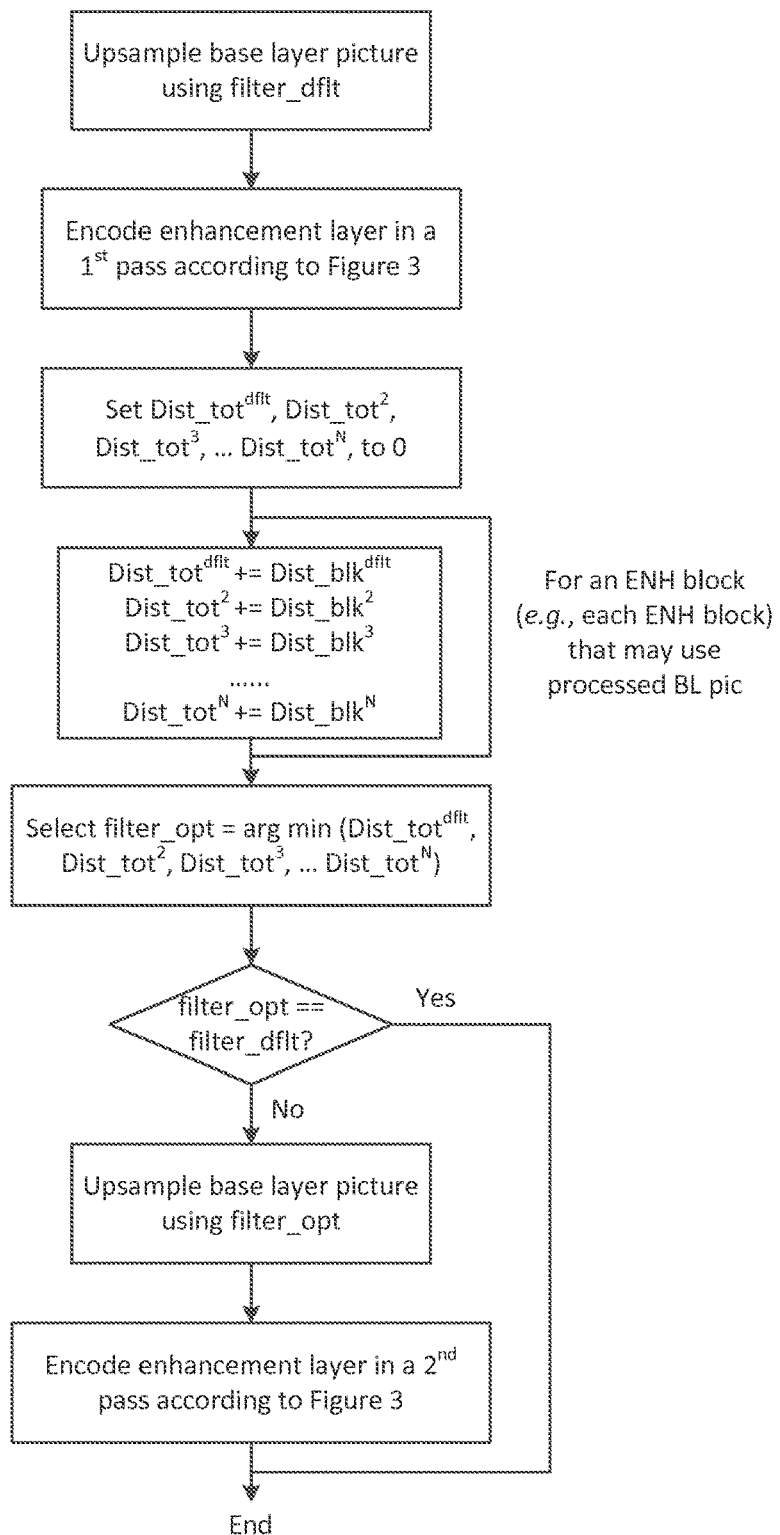
FIG. 6 is a flow chart illustrating an example of a fast picture/slice-level filter selection based on an adaptive upsampling encoding decision.

Performing multi-pass encoding may be time consuming and costly for some applications. e.g., applications that may use real-time encoding. For applications that may use real-time encoding, fast encoder decision mechanisms may be used. FIG. 6 is a diagram illustrating an example of a fast picture/slice-level filter selection based on an adaptive upsampling encoding decision. As illustrated in FIG. 6, a first encoding pass may be performed according to FIG. 3. In this encoding pass, a processed base layer reconstruction may be used to provide inter layer prediction. The processed base layer picture may be obtained by applying a default upsampling filter, denoted as filter_dflt. The default upsampling filter may be one of the N upsampling filter candidates. The default upsampling filter may be a 2-D separable filter with general design and lower complexity. To decide the optimal filter for the enhancement layer blocks that used the processed base layer picture during the first encoding pass, block distortion using the default filter and block distortion using one or more of the other candidate upsampling filters may be collected and accumulated. For example, blocks that were selected for ILR prediction of a current EL frame in the first encoding pass using the default upsampling filter may be re-encoded on a block-by-block basis using different candidate upsampling filters and collecting block distortion measurements for the candidate upsampling filters.

The filter that has the smallest overall accumulated distortion may be selected as the optimal filter (filter_opt). If filter_opt is the same as filter_dflt, then a second encoding pass may be omitted, e.g., may not be performed. Otherwise, the base layer reconstruction may be processed again using filter_opt, and a second encoding pass may be performed using the newly processed base layer picture (e.g., according to FIG. 3). This fast encoding algorithm may reduce the number of encoding passes, especially if the initial filter (filter_dflt) is set appropriately. For example, the current picture coding may derive the default upsampling filter according to the previous coding statistics.

Examples utilizing multi-pass encoding and fast encoder decision mechanisms may be combined, e.g., taking into account a balance of encoding time and performance. For example, among the N upsampling filters, a subset of A (A<N) upsampling filters may be efficient for the given video sequence to be coded. The A upsampling filters may be utilized with multi-pass encoding and the remaining B (N=A+B) upsampling filters may be utilized with the fast encoder decision mechanism.

Examples utilizing an upsampling filter or filters to the block level may be described herein. A base layer block (e.g., each base layer block) may be upsampled by an upsampling filter, e.g., the best upsampling filter among M upsampling filter candidates. The upsampled block may be used as the prediction to code the corresponding enhancement layer block. A set of upsampling filter candidates for picture/slice-level and block-level adaptations may be different.

M may be different from N. For example, M may be smaller than N since transmitting side information once per ILP block (e.g., which may be used to indicate which upsampling filter may be used) may incur bit overhead, which may be significant. For example, if M is 2, then one bit may be used to signal the upsampling filter used for a block. If M is 5, then three bits may be used to signal the upsampling filter used for a block. If M is too large, the signaling overhead may outweigh the gain achievable by selecting the optimal adaptive upsampling filter for the block. For picture/slice-level adaptation, the side information may be coded once per picture and/or once per slice and the bits used may be negligible as a percentage of the overall bitstream.

For block-level adaptation, the size-M candidate pool of upsampling filters may be constructed by different means. For example, the M candidate upsampling filters may be pre-defined and signaled in SPS. For example, the M upsampling filters for block-level adaptation may be a subset of the N upsampling filters for picture/slice-level adaptation, and may be constructed dynamically. When coding a picture, a multi-pass encoding (e.g., as illustrated in FIG. 5) and/or a fast encoding algorithm (e.g., as illustrated in FIG. 6) may be performed, and the M best upsampling filters may form the pool of M upsampling filters for block-level adaptation. For example, among the M upsampling filter candidates, K filters may be pre-defined (e.g., at a sequence level) and L filters may be selected dynamically (e.g., at a picture/slice level), where M=K+L.

Similar to picture/slice-level adaptation, at the block level, the one or more (e.g., the best) M upsampling filter candidates may be determined by different means. For example, the upsampling filter that minimizes the rate-distortion cost for the block may be selected. The distortion between the upsampled base layer block and the corresponding enhancement layer original block may be considered when choosing the best block level filter. Considering distortion and not the bit cost may be faster. When coding a video sequence, one or more of the pictures may be coded using picture/slice-level adaptive upsampling, whereas one or more of the other pictures may be coded using block-level adaptive upsampling.

Performing picture-level upsampling in the scalable system (e.g., as shown in FIG. 3 and FIG. 4) and using the upsampled picture as one of the reference pictures may reduce implementation complexity. For example, the base layer and enhancement layer encoder and decoder logics at the block level may be largely reused without changes. High level (e.g., picture/slice-level) configurations involving insertion of one or more of the processed base layer pictures into the enhancement layer DPB may be utilized. Using block-level upsampling may be realized by multiple reference pictures, which may omit block-level changes to the single layer encoder/decoder. For example, M upsampled base-layer reconstruction pictures by using M upsampling filters, respectively, may be used as additional M reference pictures when coding the enhancement layer picture. Although this may increase the reference picture list size and may increase the cost of reference index signaling at the block level (e.g., including reference index signaling overhead for temporal reference pictures), the implementation complexity may be reduced.

A plurality of the upsampling filters may be pre-defined, and coefficients of the filters may be stored in the encoder/or and the decoder. The number of pre-defined upsampling filters may be chosen to satisfy computing resource constraints, for example, memory constraints that may relate to the coefficients of the filters. An upsampling filter may code one category of videos, for example, stationary, high motion, edge-rich, and/or homogeneous. The use of pre-defined upsampling filters may be signaled using one or more flags or indicators in high-level parameter sets, for example, VPS (video parameter set) and/or SPS (sequence parameter set). A value or values of the pre-defined upsampling flag(s) may be set to true, which may mean that the pre-defined upsampling filters may be used. The number of upsampling filters may follow the flag(s) in the bitstream.

A plurality of upsampling filters may be customized for the video sequence to be coded. The encoder may code the filter coefficients into the bitstream and transmit them. On the decoder side, the filter coefficients may be received and used to decode the video sequence. The customized use of upsampling filters may be signaled using one or more flags in high-level parameter sets, for example, VPS and/or SPS. A value or values of the customized upsampling flag(s) may be set to true, which may mean that the customized upsampling filters may be used. The number of upsampling filters and the coefficients for an upsampling filter may follow the flag(s) in the bitstream. The filters and the coefficients may follow the flag(s) sequentially.

The pre-defined and the customized upsampling may be combined when used, which may mean that a plurality of upsampling filters used to code the current video sequence may include the pre-defined and the customized filters and the coefficients.

Table 1 illustrates an example set of flags and/or values that may be used in signaling of the use of pre-defined adaptive upsampling filters, and customized upsampling filter in a sequence parameter set (SPS).

As an example, a flag sps_predefined_upsampling_enabled_flag having a value of 0 may indicate that the pre-defined upsampling filters may not be used in coding the current video sequence. If the flag sps_predefined upsampling_enabled_flag has a value of 1, for example, it may indicate that the pre-defined upsampling filters may be used in coding the current video sequence.

As another example, a flag sps_customized_upsampling_enabled_flag having a value of 0 may indicate that the customized upsampling filters may not be used in coding the current video sequence. If the flag sps_customized_upsampling_enabled_flag has a value of 1, for example, it may indicate that the customized upsampling filters may be used in coding the current video sequence.

A value num_predefined_upsampling_filters_minus_1 plus one may, for example, indicate the number of pre-defined upsampling filters that may be used in coding the current video sequence. A value num_customized_upsampling_filters_minus_plus one may, for example, indicate the number of customized upsampling filters that may be used in coding the current video sequence. A value num_coeff_per_filter_minus_1 plus one may, for example, indicate the number of filter coefficients in one customized upsampling filter.

A value num_coeff_hori_minus_1[j] plus one may, for example, indicate the number of coefficients in the horizontal direction of the $j^{th}$ customized upsampling filter. A value num_coeff_vert_minus_1[j] plus one may for example, indicate the number of coefficients in the vertical direction of the $j^{th}$ customized upsampling filter.

The dimension of the filter may be indicated by a value num_coeff_hori_minus_1[j] by num_coeff_vert_minus_1 [j], and the total number of coefficients of the filter may be a product of, e.g., values num_coeff_hori_minus_1[j] and num_coeff_vert_minus_1[j]. A value upsampling_filter_coeff[j][i] may be the $i^{th}$ filter coefficient of the $j^{th}$ customized upsampling filter.

TABLE I

Signaling the use of pre-defined adaptive upsampling fillers and customized upsampling filter in SPS

| seq_parameter_set_rbsp( ) { | Descriptor |
|---|---|
| video_parameter_set_id | u(4) |
| sps_max_sub_layers_minus1 | u(3) |
| sps_temporal_id_nesting_flag | u(1) |
| sps_reserved_zero_bit | u(1) |
| profile_tier_level( 1, sps_max_sub_layers_minus1 ) | |
| seq_parameter_set_id | ue(v) |
| video_parameter_set_id | u(4) |
| ... | |
| if( nuh_layer_id > 0 ) | |
| { | |
|   sps_predefined_upsampling_enabled_flag | u(1) |
|   sps_customized_upsampling_enabled_flag | u(1) |
|   if(sps_predefined_upsampling_enabled_flag==1) | |

TABLE I-continued

Signaling the use of pre-defined adaptive upsampling fillers
and customized upsampling filter in SPS

| seq_parameter_set_rbsp( ) { | Descriptor |
|---|---|
| { | |
| num_predefined_upsampling_filters_minus_1 | ue(v) |
| } | |
| if(sps_customized_upsampling_enabled_flag==1) | |
| { | |
| num_customized_upsampling_filters_minus_1 | ue(v) |
| for(j=0;j<= | |
| num_customized_upsampling_filters_minus1;j++ | |
| { | |
| num_coeff_hori_minus_1[j] | ue(v) |
| num_coeff_vert_minus_1[j] | ue(v) |
| for(i=0;i<= num_coeff_hori_minus1[j] × num_coeff_vert_minus_1[j];i++) | |
| { | |
| upsampling_filter_coeff[j][i] | |
| } | |
| } | |
| } | |
| } | |
| ... | |

Figure 7A:
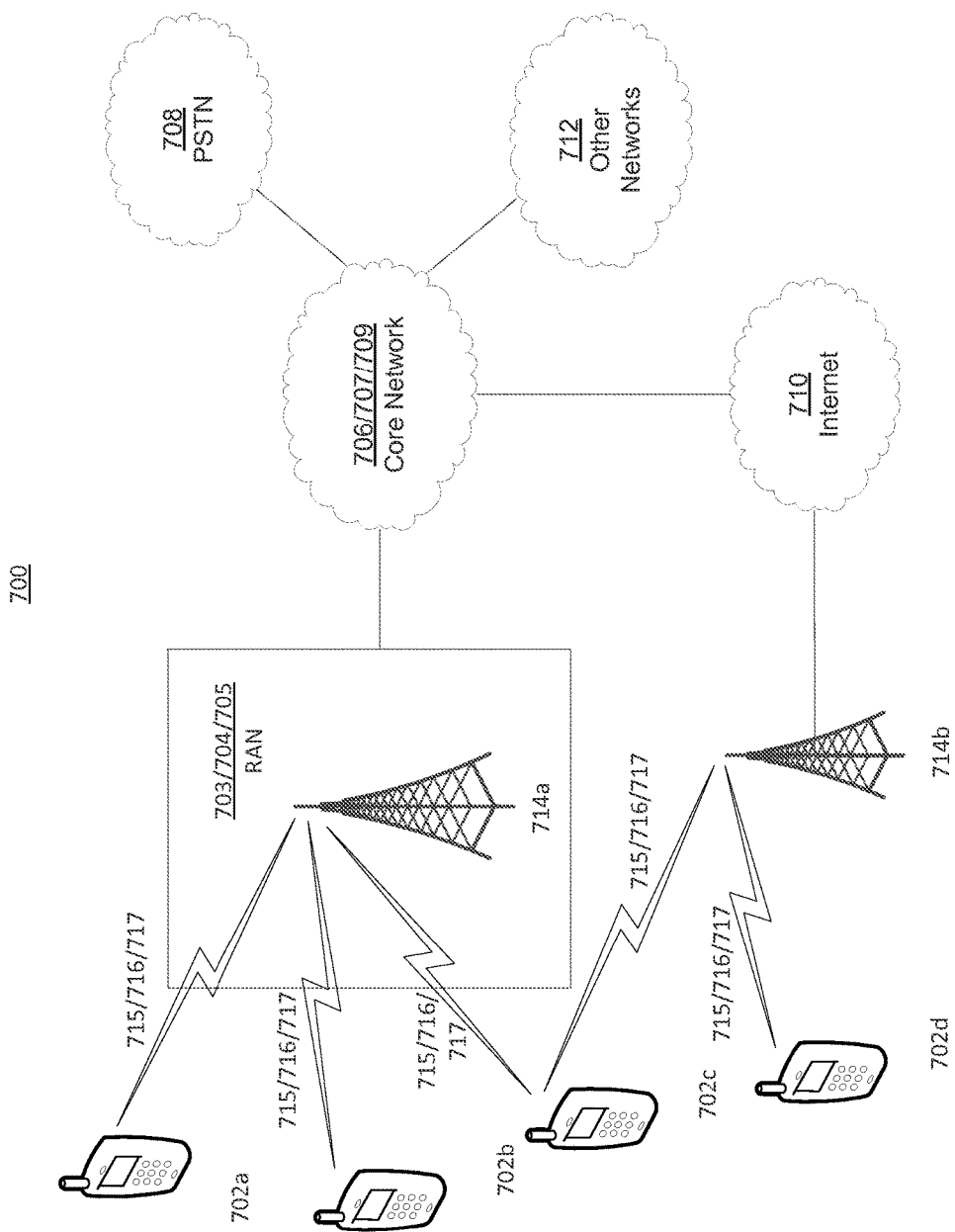
FIG. 7A is a system diagram of an example communications system in which one or more disclosed examples may be implemented.

FIG. 7A is a diagram of an example communications system 700 in which one or more disclosed examples may be implemented. The communications system 700 may be a multiple access system that provides content, such as voice, data, video, messaging, broadcast, etc., to multiple wireless users. The communications system 700 may enable multiple wireless users to access such content through the sharing of system resources, including wireless bandwidth. For example, the communications systems 700 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 7A, the communications system 700 may include wireless transmit/receive units (WTRUs) 702a, 702b, 702c, 702d, a radio access network (RAN) 703/704/705, a core network 706/707/709, a public switched telephone network (PSTN) 708, the Internet 710, and other networks 712, though it will be appreciated that the disclosed examples contemplate any number of WTRUs, base stations, networks, and/or network elements. Each of the WTRUs 702a, 702b, 702c, 702d may be any type of device configured to operate and/or communicate in a wireless environment. By way of example, the WTRUs 702a, 702b. 702c. 702d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, or any other terminal capable of receiving and processing compressed video communications.

The communications systems 700 may also include a base station 714a and a base station 714b. Each of the base stations 714a, 714b may be any type of device configured to wirelessly interface with at least one of the WTRUs 702a, 702b, 702c, 702d to facilitate access to one or more communication networks, such as the core network 706/707/709, the Internet 710, and/or the networks 712. By way of example, the base stations 714a, 714b may be a base transceiver station (BTS), a Node-B, an eNode B, a Home Node B, a Home eNode B, a site controller, an access point (AP), a wireless router, and the like. While the base stations 714a, 714b are each depicted as a single element, it will be appreciated that the base stations 714a, 714b may include any number of interconnected base stations and/or network elements.

The base station 714a may be part of the RAN 703/704/705, which may also include other base stations and/or network elements (not shown), such as a base station controller (BSC), a radio network controller (RNC), relay nodes, etc. The base station 714a and/or the base station 714b may be configured to transmit and/or receive wireless signals within a particular geographic region, which may be referred to as a cell (not shown). The cell may further be divided into cell sectors. For example, the cell associated with the base station 714a may be divided into three sectors. Thus, in one example, the base station 714a may include three transceivers, i.e., one for each sector of the cell. In another example, the base station 714a may employ multiple-input multiple output (MIMO) technology and, therefore, may utilize multiple transceivers for each sector of the cell.

The base stations 714a, 714b may communicate with one or more of the WTRUs 702a, 702b, 702c, 702d over an air interface 715/716/717, which may be any suitable wireless communication link (e.g., radio frequency (RF), microwave, infrared (IR), ultraviolet (UV), visible light, etc.). The air interface 715/716/717 may be established using any suitable radio access technology (RAT).

More specifically, as noted above, the communications system 700 may be a multiple access system and may employ one or more channel access schemes, such as CDMA, TDMA, FDMA. OFDMA, SC-FDMA, and the like. For example, the base station 714a in the RAN 703/704/705 and the WTRUs 702a, 702b, 702c may implement a radio technology such as Universal Mobile Telecommunications System (UMTS) Terrestrial Radio Access (UTRA), which may establish the air interface 715/716/717 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 714a and the WTRUs 702a, 702b, 702c may implement a radio technology such as Evolved UMTS Terrestrial Radio Access (E-UTRA), which may establish the air interface 715/716/717 using Long Term Evolution (LTE) and/or LTE-Advanced (LTE-A).

The base station 714a and the WTRUs 702a, 702b, 702c may implement radio technologies such as IEEE 802.16 (i.e., Worldwide Interoperability for Microwave Access (Wi-MAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 714b in FIG. 7A may be a wireless router, Home Node B, Home eNode B, or access point, for example, and may utilize any suitable RAT for facilitating wireless connectivity in a localized area, such as a place of business, a home, a vehicle, a campus, and the like. The base station 714b and the WTRUs 702c, 702d may implement a radio technology such as IEEE 802.11 to establish a wireless local area network (WLAN). The base station 714b and the WTRUs 702c, 702d may implement a radio technology such as IEEE 802.15 to establish a wireless personal area network (WPAN). The base station 714b and the WTRUs 702c, 702d may utilize a cellular-based RAT (e.g., WCDMA. CDMA2000, GSM, LTE. LTE-A, etc.) to establish a picocell or femtocell. As shown in FIG. 7A, the base station 714b may have a direct connection to the Internet 710. Thus, the base station 714b may not be required to access the Internet 710 via the core network 706/707/709.

The RAN 703/704/705 may be in communication with the core network 706, which may be any type of network configured to provide voice, data, applications, and/or voice over internet protocol (VoIP) services to one or more of the WTRUs 702a, 702b, 702c, 702d. For example, the core network 706/707/709 may provide call control, billing services, mobile location-based services, pre-paid calling, Internet connectivity, video distribution, etc., and/or perform high-level security functions, such as user authentication. Although not shown in FIG. 7A, it will be appreciated that the RAN 703/704/705 and/or the core network 706/707/709 may be in direct or indirect communication with other RANs that employ the same RAT as the RAN 703/704/705 or a different RAT. For example, in addition to being connected to the RAN 703/704/705, which may be utilizing an E-UTRA radio technology, the core network 706/707/709 may also be in communication with another RAN (not shown) employing a GSM radio technology.

The core network 706/707/709 may also serve as a gateway for the WTRUs 702a, 702b, 702c. 702d to access the PSTN 708, the Internet 710, and/or other networks 712. The PSTN 708 may include circuit-switched telephone networks that provide plain old telephone service (POTS). The Internet 710 may include a global system of interconnected computer networks and devices that use common communication protocols, such as the transmission control protocol (TCP), user datagram protocol (UDP) and the internet protocol (IP) in the TCP/IP internet protocol suite. The networks 712 may include wired or wireless communications networks owned and/or operated by other service providers. For example, the networks 712 may include another core network connected to one or more RANs, which may employ the same RAT as the RAN 703/704/705 or a different RAT.

Some or all of the WTRUs 702a, 702b, 702c, 702d in the communications system 700 may include multi-mode capabilities, i.e., the WTRUs 702a, 702b, 702c, 702d may include multiple transceivers for communicating with different wireless networks over different wireless links. For example, the WTRU 702c shown in FIG. 7A may be configured to communicate with the base station 714a, which may employ a cellular-based radio technology, and with the base station 714b, which may employ an IEEE 802 radio technology.

Figure 7B:
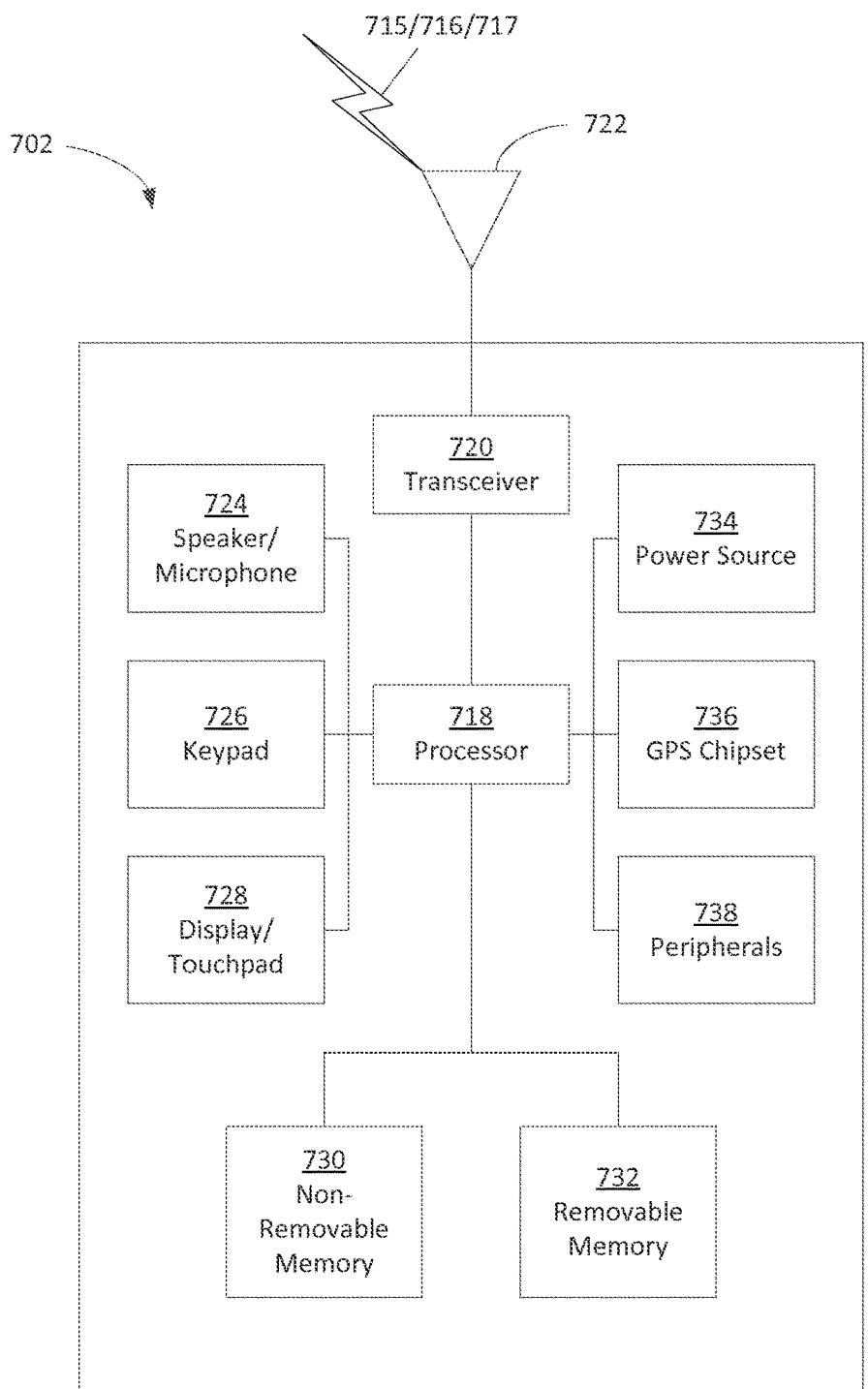
FIG. 7B is a system diagram of an example wireless transmit/receive unit (WTRU) that may be used within the communications system illustrated in FIG. 7A.

FIG. 7B is a system diagram of an example WTRU 702. As shown in FIG. 7B, the WTRU 702 may include a processor 718, a transceiver 720, a transmit/receive element 722, a speaker/microphone 724, a keypad 726, a display/touchpad 728, non-removable memory 730, removable memory 732, a power source 734, a global positioning system (GPS) chipset 736, and other peripherals 738. It will be appreciated that the WTRU 702 may include any subcombination of the foregoing elements while remaining consistent with an example. Also, the base stations 714a and 714b, and/or the nodes that base stations 714a and 714b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 7B and described herein.

The processor 718 may be a general purpose processor, a special purpose processor, a conventional processor, a digital signal processor (DSP), a graphics processing unit (GPU), a plurality of microprocessors, one or more microprocessors in association with a DSP core, a controller, a microcontroller. Application Specific Integrated Circuits (ASICs), Field Programmable Gate Array (FPGAs) circuits, any other type of integrated circuit (IC), a state machine, and the like. The processor 718 may perform signal coding, data processing, power control, input/output processing, and/or any other functionality that enables the WTRU 702 to operate in a wireless environment. The processor 718 may be coupled to the transceiver 720, which may be coupled to the transmit/receive element 722. While FIG. 7B depicts the processor 718 and the transceiver 720 as separate components, it will be appreciated that the processor 718 and the transceiver 720 may be integrated together in an electronic package or chip.

The transmit/receive element 722 may be configured to transmit signals to, or receive signals from, a base station (e.g., the base station 714a) over the air interface 715/716/717. For example, the transmit/receive element 722 may be an antenna configured to transmit and/or receive RF signals. The transmit/receive element 722 may be an emitter/detector configured to transmit and/or receive IR, UV, and/or visible light signals, for example. The transmit/receive element 722 may be configured to transmit and receive both RF and light signals. It will be appreciated that the transmit/receive element 722 may be configured to transmit and/or receive any combination of wireless signals.

In addition, although the transmit/receive element 722 is depicted in FIG. 7B as a single element, the WTRU 702 may include any number of transmit/receive elements 722. More specifically, the WTRU 702 may employ MIMO technology. The WTRU 702 may include two or more transmit/receive elements 722 (e.g., multiple antennas) for transmitting and receiving wireless signals over the air interface 715/716/717.

The transceiver 720 may be configured to modulate the signals that are to be transmitted by the transmit/receive element 722 and to demodulate the signals that are received by the transmit/receive element 722. As noted above, the WTRU 702 may have multi-mode capabilities. Thus, the transceiver 720 may include multiple transceivers for enabling the WTRU 702 to communicate via multiple RATs, such as UTRA and IEEE 802.11, for example.

The processor 718 of the WTRU 702 may be coupled to, and may receive user input data from, the speaker/microphone 724, the keypad 726, and/or the display/touchpad 728 (e.g., a liquid crystal display (LCD) display unit or organic light-emitting diode (OLED) display unit). The processor 718 may also output user data to the speaker/microphone 724, the keypad 726, and/or the display/touchpad 728. In addition, the processor 718 may access information from, and store data in, any type of suitable memory, such as the non-removable memory 730 and/or the removable memory 732. The non-removable memory 730 may include random-access memory (RAM), read-only memory (ROM), a hard disk, or any other type of memory storage device. The removable memory 732 may include a subscriber identity module (SIM) card, a memory stick, a secure digital (SD) memory card, and the like. The processor 718 may access information from, and store data in, memory that is not physically located on the WTRU 702, such as on a server or a home computer (not shown).

The processor 718 may receive power from the power source 734, and may be configured to distribute and/or control the power to the other components in the WTRU 702. The power source 734 may be any suitable device for powering the WTRU 702. For example, the power source 734 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 718 may also be coupled to the GPS chipset 736, which may be configured to provide location information (e.g., longitude and latitude) regarding the current location of the WTRU 702. In addition to, or in lieu of, the information from the GPS chipset 736, the WTRU 702 may receive location information over the air interface 715/716/717 from a base station (e.g., base stations 714a, 714b) and/or determine its location based on the timing of the signals being received from two or more nearby base stations. It will be appreciated that the WTRU 702 may acquire location information by way of any suitable location-determination method while remaining consistent with an example.

The processor 718 may further be coupled to other peripherals 738, which may include one or more software and/or hardware modules that provide additional features, functionality and/or wired or wireless connectivity. For example, the peripherals 738 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 7C:
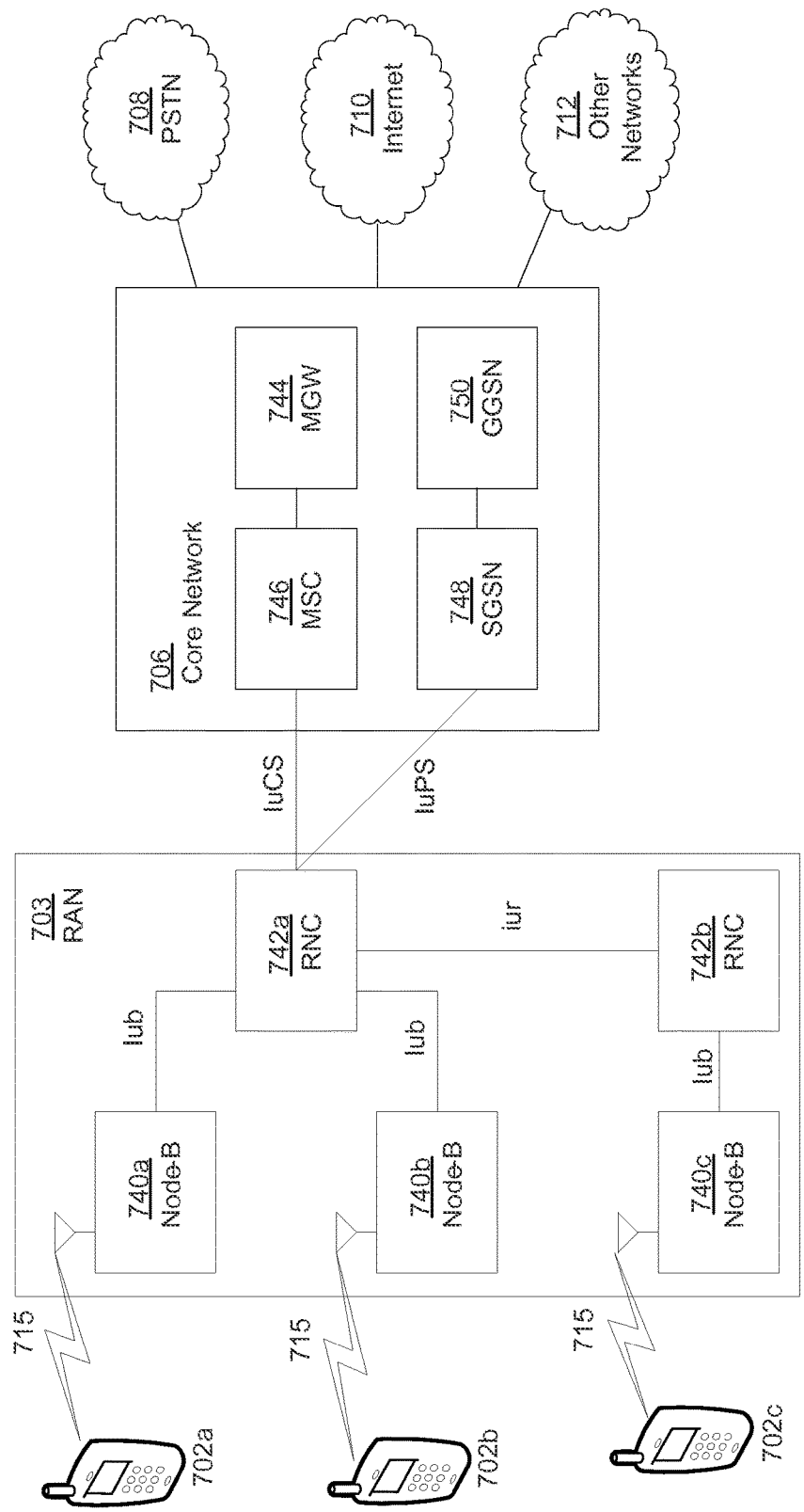
FIG. 7C is a system diagram of an example radio access network and an example core network that may be used within the communications system illustrated in FIG. 7A.

FIG. 7C is a system diagram of the RAN 703 and the core network 706 according to an example. As noted above, the RAN 703 may employ a UTRA radio technology to communicate with the WTRUs 702a, 702b, 702c over the air interface 715. The RAN 704 may also be in communication with the core network 706. As shown in FIG. 7C, the RAN 703 may include Node-Bs 740a, 740b, 740c, which may each include one or more transceivers for communicating with the WTRUs 702a, 702b, 702c over the air interface 715. The Node-Bs 740a, 740b, 740c may each be associated with a particular cell (not shown) within the RAN 703. The RAN 703 may also include RNCs 742a, 742b. It will be appreciated that the RAN 703 may include any number of Node-Bs and RNCs while remaining consistent with an example.

As shown in FIG. 7C, the Node-Bs 740a, 740b may be in communication with the RNC 742a. Additionally, the Node-B 740c may be in communication with the RNC 742b. The Node-Bs 740a, 740b, 740c may communicate with the respective RNCs 742a, 742b via an Iub interface. The RNCs 742a, 742b may be in communication with one another via an Iur interface. Each of the RNCs 742a, 742b may be configured to control the respective Node-Bs 740a, 740b, 740c to which it is connected. In addition, each of the RNCs 742a, 742b may be configured to carry out or support other functionality, such as outer loop power control, load control, admission control, packet scheduling, handover control, macrodiversity, security functions, data encryption, and the like.

The core network 706 shown in FIG. 7C may include a media gateway (MGW) 744, a mobile switching center (MSC) 746, a serving GPRS support node (SGSN) 748, and/or a gateway GPRS support node (GGSN) 750. While each of the foregoing elements are depicted as part of the core network 706, it will be appreciated that any one of these elements may be owned and/or operated by an entity other than the core network operator.

The RNC 742a in the RAN 703 may be connected to the MSC 746 in the core network 706 via an IuCS interface. The MSC 746 may be connected to the MGW 744. The MSC 746 and the MGW 744 may provide the WTRUs 702a, 702b, 702c with access to circuit-switched networks, such as the PSTN 708, to facilitate communications between the WTRUs 702a, 702b, 702c and traditional land-line communications devices.

The RNC 742a in the RAN 703 may also be connected to the SGSN 748 in the core network 706 via an IuPS interface. The SGSN 748 may be connected to the GGSN 750. The SGSN 748 and the GGSN 750 may provide the WTRUs 702a, 702b, 702c with access to packet-switched networks, such as the Internet 710, to facilitate communications between and the WTRUs 702a, 702b, 702c and IP-enabled devices.

As noted above, the core network 706 may also be connected to the networks 712, which may include other wired or wireless networks that are owned and/or operated by other service providers.

Figure 7D:
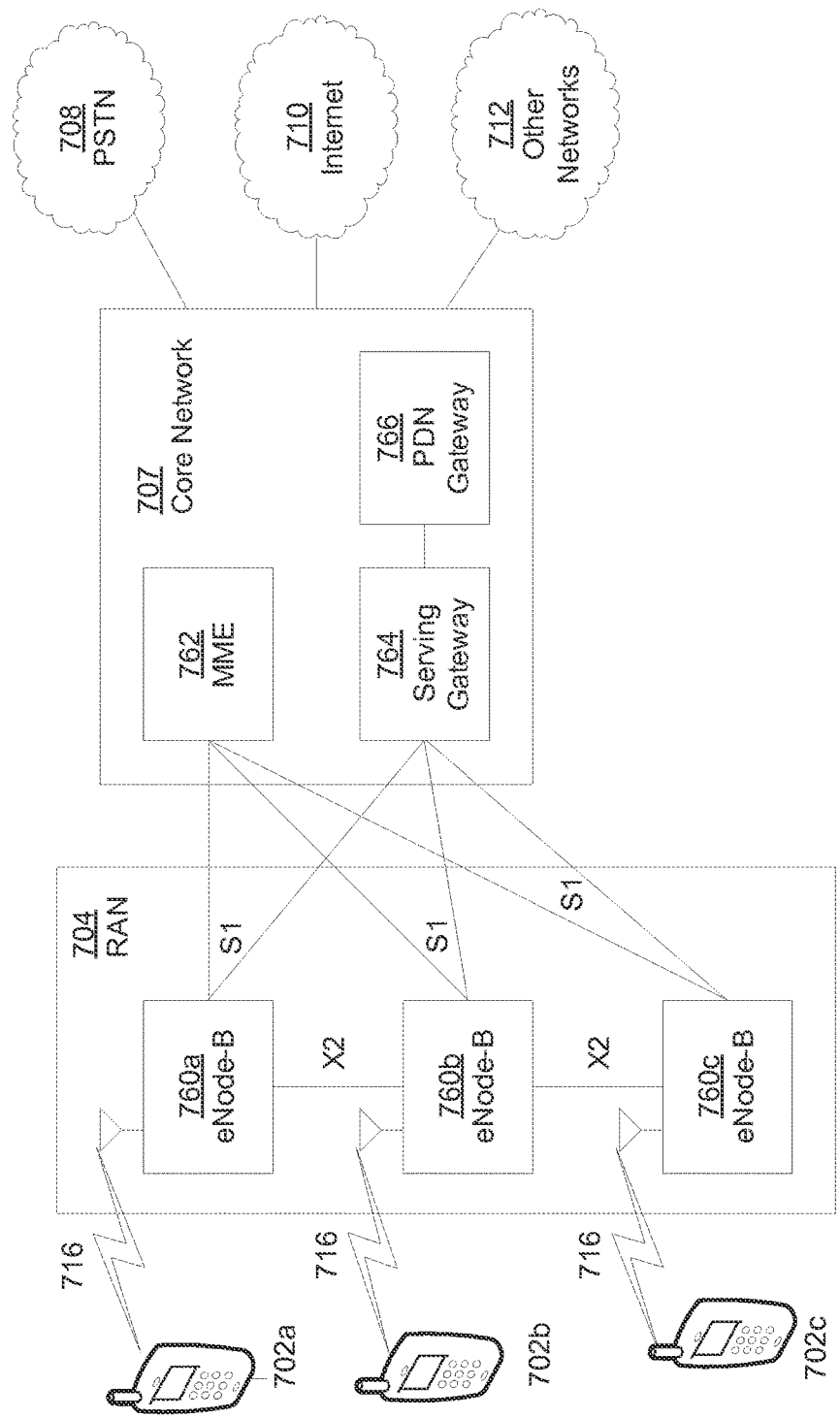
FIG. 7D is a system diagram of another example radio access network and another example core network that may be used within the communications system illustrated in FIG. 7A.

FIG. 7D is a system diagram of the RAN 704 and the core network 707 according to another example. As noted above, the RAN 704 may employ an E-UTRA radio technology to communicate with the WTRUs 702a, 702b, 702c over the air interface 716. The RAN 704 may also be in communication with the core network 707.

The RAN 704 may include eNode-Bs 760a, 760b, 760c, though it will be appreciated that the RAN 704 may include any number of eNode-Bs while remaining consistent with an example. The eNode-Bs 760a, 760b, 760c may each include one or more transceivers for communicating with the WTRUs 702a, 702b, 702c over the air interface 716. The eNode-Bs 760a, 760b, 760c may implement MIMO technology. Thus, the eNode-B 760a, for example, may use multiple antennas to transmit wireless signals to, and receive wireless signals from, the WTRU 702a.

Each of the eNode-Bs 760a, 760b, 760c may be associated with a particular cell (not shown) and may be configured to handle radio resource management decisions, handover decisions, scheduling of users in the uplink and/or downlink, and the like. As shown in FIG. 7D, the eNode-Bs 760a, 760b, 760c may communicate with one another over an X2 interface.

The core network 707 shown in FIG. 7D may include a mobility management gateway (MME) 762, a serving gateway 764, and a packet data network (PDN) gateway 766. While each of the foregoing elements are depicted as part of the core network 707, it will be appreciated that any one of these elements may be owned and/or operated by an entity other than the core network operator.

The MME 762 may be connected to each of the eNode-Bs 760a, 760b, 760c in the RAN 704 via an SI interface and may serve as a control node. For example, the MME 762 may be responsible for authenticating users of the WTRUs 702a, 702b, 702c, bearer activation/deactivation, selecting a particular serving gateway during an initial attach of the WTRUs 702a, 702b, 702c, and the like. The MME 762 may also provide a control plane function for switching between the RAN 704 and other RANs (not shown) that employ other radio technologies, such as GSM or WCDMA.

The serving gateway 764 may be connected to each of the eNode Bs 760a, 760b, 760c in the RAN 704 via the SI interface. The serving gateway 764 may generally route and forward user data packets to/from the WTRUs 702a, 702b, 702c. The serving gateway 764 may also perform other functions, such as anchoring user planes during inter-eNode B handovers, triggering paging when downlink data is available for the WTRUs 702a, 702b, 702c, managing and storing contexts of the WTRUs 702a. 702b, 702c, and the like.

The serving gateway 764 may also be connected to the PDN gateway 766, which may provide the WTRUs 702a, 702b, 702c with access to packet-switched networks, such as the Internet 710, to facilitate communications between the WTRUs 702a, 702b, 702c and IP-enabled devices.

The core network 707 may facilitate communications with other networks. For example, the core network 707 may provide the WTRUs 702a, 702b, 702c with access to circuit-switched networks, such as the PSTN 708, to facilitate communications between the WTRUs 702a, 702b, 702c and traditional land-line communications devices. For example, the core network 707 may include, or may communicate with, an IP gateway (e.g., an IP multimedia subsystem (IMS) server) that serves as an interface between the core network 707 and the PSTN 708. In addition, the core network 707 may provide the WTRUs 702a, 702b, 702c with access to the networks 712, which may include other wired or wireless networks that are owned and/or operated by other service providers.

Figure 7E:
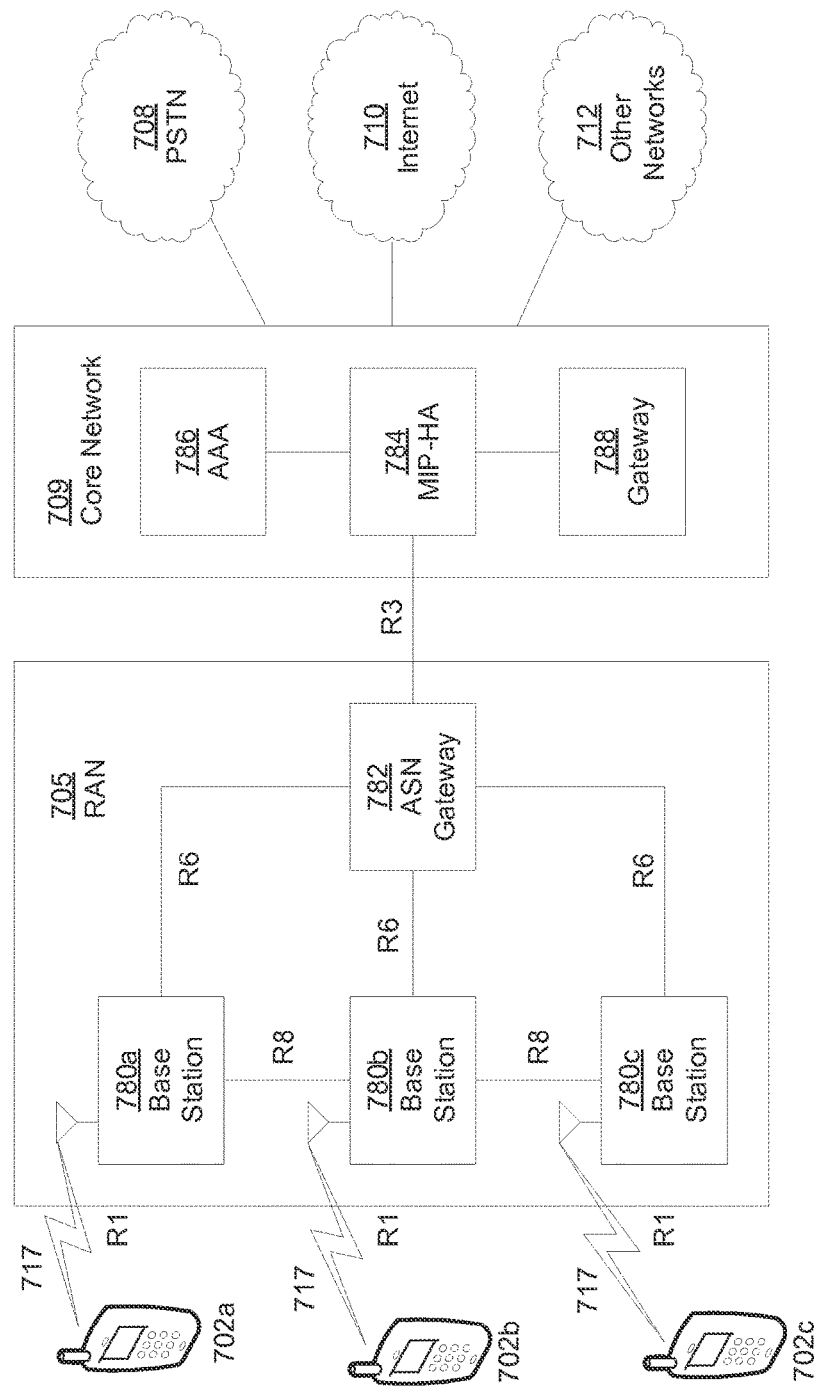
FIG. 7E is a system diagram of another example radio access network and another example core network that may be used within the communications system illustrated in FIG. 7A.

FIG. 7E is a system diagram of the RAN 705 and the core network 709 according to another example. The RAN 705 may be an access service network (ASN) that employs IEEE 802.16 radio technology to communicate with the WTRUs 702a, 702b, 702c over the air interface 717. As will be further discussed below, the communication links between the different functional entities of the WTRUs 702a, 702b, 702c, the RAN 705, and the core network 709 may be defined as reference points.

As shown in FIG. 7E, the RAN 705 may include base stations 780a, 780b, 780c, and an ASN gateway 782, though it will be appreciated that the RAN 705 may include any number of base stations and ASN gateways while remaining consistent with an example. The base stations 780a, 780b, 780c may each be associated with a particular cell (not shown) in the RAN 705 and may each include one or more transceivers for communicating with the WTRUs 702a, 702b, 702c over the air interface 717. The base stations 780a, 780b. 780c may implement MIMO technology. Thus, the base station 780a, for example, may use multiple antennas to transmit wireless signals to, and receive wireless signals from, the WTRU 702a. The base stations 780a, 780b, 780c may also provide mobility management functions, such as handoff triggering, tunnel establishment, radio resource management, traffic classification, quality of service (QoS) policy enforcement, and the like. The ASN gateway 782 may serve as a traffic aggregation point and may be responsible for paging, caching of subscriber profiles, routing to the core network 709, and the like.

The air interface 717 between the WTRUs 702a, 702b, 702c and the RAN 705 may be defined as an R1 reference point that implements the IEEE 802.16 specification. In addition, each of the WTRUs 702a, 702b, 702c may establish a logical interface (not shown) with the core network 709. The logical interface between the WTRUs 702a, 702b, 702c and the core network 709 may be defined as an R2 reference point, which may be used for authentication, authorization, IP host configuration management, and/or mobility management.

The communication link between each of the base stations 780a, 780b, 780c may be defined as an R8 reference point that includes protocols for facilitating WTRU handovers and the transfer of data between base stations. The communication link between the base stations 190a. 780b, 780c and the ASN gateway 782 may be defined as an R6 reference point. The R6 reference point may include protocols for facilitating mobility management based on mobility events associated with each of the WTRUs 702a, 702b, 700c.

As shown in FIG. 7E, the RAN 705 may be connected to the core network 709. The communication link between the RAN 705 and the core network 709 may defined as an R3 reference point that includes protocols for facilitating data transfer and mobility management capabilities, for example. The core network 709 may include a mobile IP home agent (MIP-HA) 784, an authentication, authorization, accounting (AAA) server 786, and a gateway 788. While each of the foregoing elements are depicted as part of the core network 709, it will be appreciated that any one of these elements may be owned and/or operated by an entity other than the core network operator.

The MIP-HA 784 may be responsible for IP address management, and may enable the WTRUs 702a, 702b, 702c to roam between different ASNs and/or different core networks. The MIP-HA 784 may provide the WTRUs 702a, 702b, 702c with access to packet-switched networks, such as the Internet 710, to facilitate communications between the WTRUs 702a, 702b, 702c and IP-enabled devices. The AAA server 786 may be responsible for user authentication and for supporting user services. The gateway 788 may facilitate interworking with other networks. For example, the gateway 788 may provide the WTRUs 702a, 702b, 702c with access to circuit-switched networks, such as the PSTN 708, to facilitate communications between the WTRUs 702a, 702b, 702c and traditional land-line communications devices. In addition, the gateway 788 may provide the WTRUs 702a, 702b, 702c with access to the networks 712, which may include other wired or wireless networks that are owned and/or operated by other service providers.

Although not shown in FIG. 7E, it will be appreciated that the RAN 705 may be connected to other ASNs and the core network 709 may be connected to other core networks. The communication link between the RAN 705 the other ASNs may be defined as an R4 reference point, which may include protocols for coordinating the mobility of the WTRUs 702a, 702b, 702c between the RAN 705 and the other ASNs. The communication link between the core network 709 and the other core networks may be defined as an R5 reference, which may include protocols for facilitating interworking between home core networks and visited core networks.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed:

1. A method for communicating video data, the method comprising:
   selecting an upsampling filter for a video sequence to create enhancement layer pictures by:
      applying a default upsampling filter to a base layer picture to obtain a processed base layer picture;
      identifying blocks of the processed base layer picture that are selected for interlayer prediction of an enhancement layer frame; and
      selecting one of the default upsampling filter and the plurality of candidate upsampling filters based on a comparison of block distortion measurements on the identified blocks associated with each of the default upsampling filter and the plurality of candidate upsampling filters;
   encoding upsampling filter information, wherein the upsampling filter information comprises a plurality of coefficients of the selected upsampling filter; and
   sending the encoded upsampling filter information and the enhancement layer pictures in an output video bitstream.

2. The method of claim 1, wherein the selected upsampling filter is applied at a sequence level of the video sequence to create the enhancement layer bitstream.

3. The method of claim 1, further comprising selecting a second upsampling filter from a plurality of candidate upsampling filters by:
   determining whether knowledge of a content of the video sequence exists; and
   upon determining that knowledge of the content of the video sequence exists, selecting a candidate upsampling filter that is designed for the content of the video sequence.

4. The method of claim 1, further comprising selecting a second upsampling filter from a plurality of candidate upsampling filters by:
   determining whether knowledge of a category related to the video sequence exists; and
   upon determining that knowledge of the category related to the video sequence exists, selecting a candidate upsampling filter that is designed for the category related to the video sequence.

5. The method of claim 1, wherein the selected upsampling filter is applied at a picture or slice level of the video sequence.

6. The method of claim 5, further comprising selecting a second upsampling filter from a plurality of candidate upsampling filters by:
   performing multi-pass encoding on an enhancement layer picture of the video sequence utilizing the plurality of candidate upsampling filters; and
   selecting the second upsampling filter from the plurality of candidate upsampling filters based on the performance of the second upsampling filter during the multi-pass encoding.

7. The method of claim 6, wherein the performance of the second upsampling filter is evaluated using a rate distortion cost.

8. The method of claim 1, wherein selecting one of the default upsampling filter and the plurality of candidate upsampling filters based on a comparison of block distortion measurements comprises selecting one of the default upsampling filter and the plurality of candidate upsampling filters with the lowest associated distortion.

9. The method of claim 5, further comprising selecting a second upsampling filter by:
   performing multi-pass encoding on an enhancement layer picture of the video sequence for each of a first plurality of candidate upsampling filters; and
   selecting one of the first plurality of candidate upsampling filters corresponding to a coding pass that best satisfies a criterion.

10. The method of claim 1, further comprising:
    for a previously received video sequence, generating a set of training data comprising a reconstructed base layer picture and an original enhancement layer input picture of the previously received video sequence; and
    training the upsampling filter using a least squared method that uses the set of training data of the previously received video sequence.

11. A system comprising executable instruction that cause the system to perform operations comprising:
    selecting an upsampling filter for a video sequence to create enhancement layer pictures by:
       applying a default upsampling filter to a base layer picture to obtain a processed base layer picture;
       identifying blocks of the processed base layer picture that are selected for interlayer prediction of an enhancement layer frame; and
       selecting one of the default upsampling filter and the plurality of candidate upsampling filters based on a comparison of block distortion measurements on the identified blocks associated with each of the default upsampling filter and the plurality of candidate upsampling filters;
    encoding upsampling filter information, the upsampling filter information comprising a plurality of coefficients of the selected upsampling filter; and
    sending the encoded upsampling filter information and the enhancement layer pictures in an output video bitstream.

12. The system of claim 11, wherein the selected upsampling filter is applied at a sequence level of the video sequence to create the enhancement layer bitstream.

13. The system of claim 11, further comprising executable instruction that cause the system to perform further operations comprising:
    selecting a second upsampling filter from a plurality of candidate upsampling filters by:
       determining whether knowledge of a content of the video sequence exists; and
       upon determining that knowledge of the content of the video sequence exists, selecting a candidate upsampling filter that is designed for the content of the video sequence.

14. The system of claim 11, further comprising executable instruction that cause the system to perform further operations comprising:
    selecting a second upsampling filter from a plurality of candidate upsampling filters by:
       determining whether knowledge of a category related to the video sequence exists; and
       upon determining that knowledge of the category related to the video sequence exists, selecting a candidate upsampling filter that is designed for the category related to the video sequence.

15. The system of claim 11, wherein the selected upsampling filter is applied at a picture or slice level of the video sequence.

16. The system of claim 15, further comprising executable instruction that cause the system to perform further operations comprising:

selecting a second upsampling filter from a plurality of candidate upsampling filters by:

performing multi-pass encoding on an enhancement layer picture of the video sequence utilizing the plurality of candidate upsampling filters; and selecting the second upsampling filter from the plurality of candidate upsampling filters based on the performance of the second upsampling filter during the multi-pass encoding.

17. The system of claim 16, wherein the performance of the second upsampling filter is evaluated using a rate distortion cost.

18. The system of claim 11, wherein selecting one of the default upsampling filter and the plurality of candidate upsampling filters based on a comparison of block distortion measurements comprises selecting one of the default upsampling filter and the plurality of candidate upsampling filters with the lowest associated distortion.

19. The system of claim 5, further comprising executable instruction that cause the system to perform further operations comprising:

selecting a second upsampling filter by:

performing multi-pass encoding on an enhancement layer picture of the video sequence for each of a first plurality of candidate upsampling filters; and selecting one of the first plurality of candidate upsampling filters corresponding to a coding pass that best satisfies a criterion.

20. The system of claim 11, further comprising executable instruction that cause the system to perform further operations comprising:

for a previously received video sequence, generating a set of training data comprising a reconstructed base layer picture and an original enhancement layer input picture of the previously received video sequence; and training the upsampling filter using a least squared method that uses the set of training data of the previously received video sequence.

* * * * *